(12) United States Patent
Kelly

(10) Patent No.: US 6,976,170 B1
(45) Date of Patent: Dec. 13, 2005

(54) METHOD FOR DETECTING PLAGIARISM

(76) Inventor: Adam V. Kelly, 1635 Cooper Ave., Lansing, MI (US) 48910-2640

( * ) Notice: Subject to any disclaimer, the term of this patent is extended or adjusted under 35 U.S.C. 154(b) by 945 days.

(21) Appl. No.: 09/977,172

(22) Filed: Oct. 15, 2001

(51) Int. Cl.[7] .............................................. H04L 9/00
(52) U.S. Cl. ..................... 713/181; 713/170
(58) Field of Search ................ 713/155, 181, 713/170; 710/55; 715/512; 714/707, 48

(56) References Cited

U.S. PATENT DOCUMENTS

| | | | | |
|---|---|---|---|---|
| 4,807,182 A | * | 2/1989 | Queen ......................... | 715/511 |
| 5,247,524 A | * | 9/1993 | Callon ........................ | 714/807 |
| 5,500,864 A | * | 3/1996 | Gonia et al. ................ | 714/807 |
| 5,701,316 A | * | 12/1997 | Alferness et al. ........... | 714/807 |
| 6,772,196 B1 | * | 8/2004 | Kirsch et al. ............... | 709/206 |
| 2003/0145206 A1 | * | 7/2003 | Wolosewicz et al. ....... | 713/176 |
| 2004/0111668 A1 | * | 6/2004 | Cragun et al. .............. | 715/512 |

OTHER PUBLICATIONS iParadigms.com, 1999, "Turnitin.com"/"Plagiarism.org" p. 1(turnitin.com), pp. 1-3 (sentence of paragraph addition).*

* cited by examiner

Primary Examiner—Gregory Morse
Assistant Examiner—Thomas Ho
(74) Attorney, Agent, or Firm—Donald R. Schoonover

(57) ABSTRACT

Numerical values are calculated for each sentence in a document being checked for plagiarism and compared to numerical values determined for archive documents. If the numerical values match or are within a predetermined range of each other, a note is made and a reviewer can closely review the submitted document to make a determination whether plagiarism has been committed.

3 Claims, 2 Drawing Sheets

FIG. 2.

HAND-IN PROGRAM ~12

- STUDENT INPUTS PASSWORD AND TEACHER ID ~22
- VERIFY PASSWORD AND ID ~24
- SET CURRENT DIRECTORY BASED ON TEACHER ID ~26
- ALLOW STUDENT TO SELECT FILE TO HAND IN ~28
- READ IN STUDENT FILE ~30
- STORE EACH SENTENCE OF STUDENT FILE IN AN ARRAY OF STRING VARIABLES ~32
- TRANSLATE EACH SENTENCE INTO A NUMERICAL VALUE AS FOLLOWS: ~34
    - SET THE NUMERICAL VALUE OF THE SENTENCE TO ZERO ~36
    - GET THE ASCII VALUE OF THE CURRENT CHARACTER AND SQUARE IT ~38
    - ADD THE SQUARED VALUE TO THE NUMERICAL VALUE BEING ACCUMULATED FOR THE SENTENCE ~40
    - REPEAT THE TWO IMMEDIATELY PRECEDING SUBSTEPS THROUGH THE END OF THE SENTENCE ~42
- CREATE A FILE FOR THE STUDENT IN THE TEACHER'S ARCHIVE BASED ON THE TEACHER ID ~44
    - WRITE THE ORIGINAL SENTENCE ON THE NEXT AVAILABLE LINE OF THE FILE ~46
    - WRITE THE NUMERICAL VALUE OF THE SENTENCE ON THE NEXT AVAILABLE LINE OF THE FILE ~48
- REPEAT THE TWO IMMEDIATELY PRECEDING SUBSTEPS UNTIL ALL SENTENCES AND NUMERICAL VALUES HAVE BEEN WRITTEN TO THE FILE ~49

VALIDATION PROGRAM ~14

- TEACHER INPUTS TEACHER ID ~50
- SET CURRENT DIRECTORY BASED ON TEACHER ID ~52
- READ IN ALL FILES FROM CURRENT DIRECTORY ~54
- DISPLAY A LIST OF ALL STUDENTS THAT TURNED IN WORK ~56
- SELECT A STUDENT'S NAME TO VIEW THE DOCUMENT THAT HE TURNED IN ~58
- DISPLAY THE SELECTED STUDENT'S DOCUMENT IN A RICH TEXT FORMAT BOX ~60

PLAGIARISM PREVENTION PROGRAM ~16

- TEACHER INPUTS TEACHER ID ~62
- SET CURRENT DIRECTORY BASED ON TEACHER ID ~64
- TEACHER SELECTS EITHER OTHER ARCHIVES, OR DOCUMENTS IN THE CURRENT DIRECTORY TURNED IN BY OTHER STUDENTS, FOR COMPARISON ~66
- READ IN EACH DOCUMENT FROM THE SELECTED ARCHIVES OR DIRECTORY ~68
    - ONLY THE NUMERICAL VALUES OF THE SENTENCES ARE READ IN AND STORED AT THIS TIME ~70
- NUMERICAL VALUES OF ALL SENTENCES ARE SORTED USING A COMB-TYPE SORT ~72
- CHECK FOR ESSENTIALLY IDENTICAL SENTENCES BY SCROLLING THROUGH THE SORTED LIST ~74
    - COMPARE THE CURRENT VALUE WITH THE NEXT VALUE ~76
    - IF ESSENTIALLY THE SAME VALUE, RECORD THAT TWO SENTENCES MATCH, CHECK THE NEXT VALUE ~78
    - IF NOT ESSENTIALLY THE SAME VALUE, NEXT ELEMENT ON THE LIST BECOMES THE CURRENT VALUE ~80
    - REPEAT THE THREE IMMEDIATELY PRECEDING SUBSTEPS UNTIL ENTIRE LIST HAS BEEN CHECKED ~82
- REPORT THE SOURCES THAT HAD MATCHING SENTENCES ALONG WITH THE NUMBER OF OCCURRENCES ~84
- ALLOW TEACHER TO SELECT ANOTHER ARCHIVE TO COMPARE SENTENCE VALUES WITH ~86
- ALLOW TEACHER TO ARCHIVE AND NAME CURRENT DIRECT DIRECTORY FOR FUTURE USE ~88

METHOD FOR DETECTING PLAGIARISM

BACKGROUND OF THE INVENTION

1. Field of the Invention

The present invention relates to the general art of data management, and to the particular field of authenticating data.

2. Discussion of the Related Art

Many schools and other institutions of learning are assigning more and more papers to be written by students. A paper not only increases a student's knowledge of a particular subject, it increases a student's research and expression skills. While often more difficult and time consuming to read and grade, many teachers are using papers as a major teaching tool.

However, with all students now being very proficient in using the Internet, as well as proficient in communicating with other students, a problem has arisen connected to the true authorship of the ideas and/or actual expression of those ideas presented in papers submitted by students. If a paper is not outright plagiarized, there has been many instances in which much of a paper is not really the student's own individual work. Much of the material in a paper may be taken from other sources, if not actually copied from such other sources.

However, it is extremely difficult for a teacher to determine that a paper submitted by a student as his or her own work is actually the individual work of that student. There have been many stories reported in newspapers and elsewhere of widespread plagiarism at various institutions.

Therefore, there is a need for a method for determining if a document submitted as an individual's own work is actually that individual's work, or if it has been substantially copied from another source.

While many academic institutions have honor codes that prohibit plagiarism and often require students to sign such codes and sign a document for each paper submitted that the submitted paper is his or her own work, such methods are not foolproof. An individual who plagiarizes may also be the type of individual who also would sign such a document even though it is not truthful.

Therefore, there is a need for a method to determine whether a document submitted as an individual's own work is actually that individual's work, or whether it has been substantially copied from another source, such a method that is more reliable than present methods that often rely on the individual's own honesty.

Many teachers and educators rely on their own judgement and their own knowledge in determining whether a student's work has been copied. This judgement is based on the teacher's knowledge of the student. While this is often quite effective, it may not be as efficient as possible if the teacher has many students, where the teacher may not know each student well enough to accurately make such a determination.

Therefore, there is a need for a method to determine whether a document submitted as an individual's own work is actually that individual's work, or whether it has been substantially copied from another source, such a method that is more reliable than relying on a teacher's knowledge of the student.

However, any method for checking an individual's work for plagiarism must not be overburdensome on a teacher who is already pressed for time. Such a method must also be easy to learn and perform. Otherwise, many teachers will not learn and/or use the method.

Therefore, there is a need for a method to determine whether a document submitted as an individual's own work is actually that individual's work, or whether it has been substantially copied from another source, such a method that is reliable yet is easy to learn and to use.

However, the consequences of determining that a document has been plagiarized are often so dire, such a determination should not be made without human intervention. That is, such a determination should only be finally made by the teacher. Any method used in reaching this conclusion should allow for human intervention before reaching a final conclusion.

Therefore, there is a need for a method to determine whether a document submitted as an individual's own work is actually that individual's work, or whether it has been substantially copied from another source, such a method that is reliable yet is not totally dependent on machines and provides for the possibility of a human making the final decision.

PRINCIPAL OBJECTS OF THE INVENTION

It is a main object of the present invention to provide a method to determine whether a document submitted as an individual's own work is actually that individual's work, or whether it has been substantially copied from another source that is reliable.

It is another object of the present invention to provide a method to determine whether a document submitted as an individual's own work is actually that individual's work, or whether it has been substantially copied from another source, such a method that is more reliable than relying on a person's honesty.

It is another object of the present invention to provide a method to determine whether a document submitted as an individual's own work is actually that individual's work, or whether it has been substantially copied from another source, such a method that is more reliable than relying on a teacher's knowledge of the student.

It is another object of the present invention to provide a method to determine whether a document submitted as an individual's own work is actually that individual's work, or whether it has been substantially copied from another source, such a method that is reliable yet is not difficult to learn or burdensome to use.

It is another object of the present invention to provide a method to determine whether a document submitted as an individual's own work is actually that individual's work, or whether it has been substantially copied from another source, such a method that is reliable yet is not totally dependent on machines and provides for the possibility of a human making the final decision.

SUMMARY OF THE INVENTION

These, and other, objects are achieved by a method of checking a document that has been submitted as an individual's own work against archives and assigning numerical values to the sentences of both the document and the archives and then comparing the numerical values against each other. If the numerical of any sentence in the submitted document matches the numerical value of any sentence in the archive, the sentence in the document is noted. The teacher can then review the number of sentences noted and make a determination if further investigation is needed. In the method of the present invention, the value assigned to any sentence is compared to a value assigned to a sentence in an archive. In this disclosure the values of the document sentence and the archive sentence will be considered essentially equal to each other when the values are either actually equal or within a pre-set range of each other. The pre-set range can be determined by the individual conducting the check. This leaves more room for human judgement in making the final decision regarding whether plagiarism has occurred.

The method of the present invention can be carried out using a computer program and the teacher needs only to learn how to use the computer program. The computer program automatically carries out the check and comparison, and the teacher can perform other tasks while the check and comparison is being carried out. This relieves some of the burden of checking for originality in papers submitted by students as original work. However, a final conclusion is made by the teacher and is not an automatic conclusion made by a computer program in order to allow human reasoning and judgement to be used in making a final determination.

BRIEF DESCRIPTION OF THE DRAWINGS

FIG. 2 is a flow chart illustrating the steps embodied in the present invention.

DETAILED DESCRIPTION OF THE INVENTION

Figure 1:
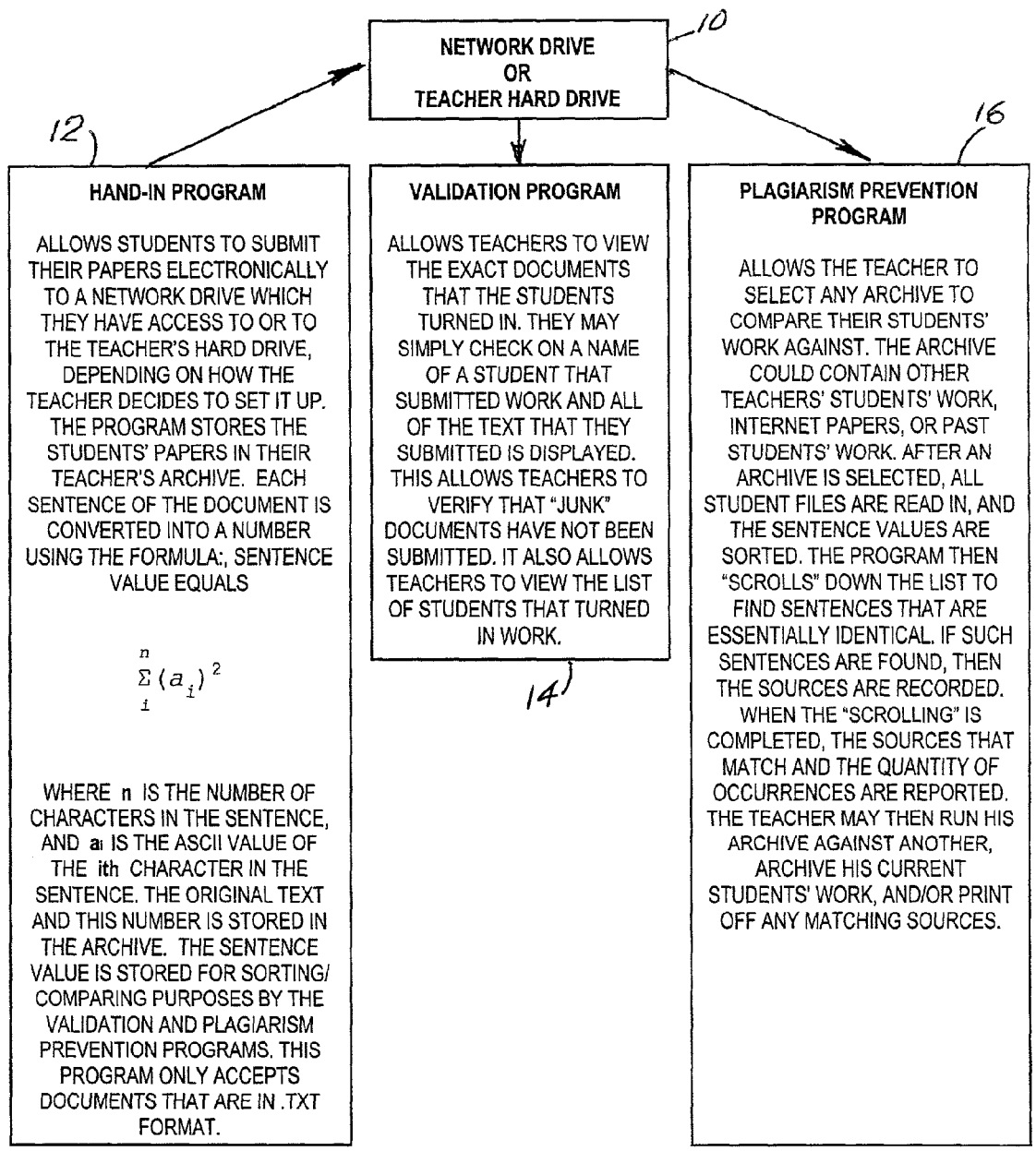
FIG. 1 is a flow chart illustrating the broad aspects of the method embodying the teaching of the present invention.

Other objects, features and advantages of the invention will become apparent from a consideration of the following detailed description and the accompanying drawings.

It is noted that while one form of the method embodying the present invention will be described with reference to a teacher reviewing papers submitted by students, it is understood that the method can be used by anyone charged with reviewing documents submitted to that person. Thus, while teachers, students and papers will be referred to, it is understood that other reviewers, submitters and documents can be used without departing from the scope of the present invention.

Thus, in broad terms, the method embodying the present invention includes assigning a numerical value to each sentence in a document being reviewed for plagiarism, and comparing these numerical values against numerical values assigned to sentences in an archival document. The archival document can be work of other students, documents available on the Internet, documents available in local libraries, or the like. The numerical values are assigned by loading the document in a computer, and assigning the numerical values according to a simple formula in a computer program. The computer program can then automatically check the numerical values and note numerical values from the submitted document that are equal to, or within a preset range of, the numerical values in the archival documents. A reviewer then reviews the document if there are too many matches as determined by the reviewer based on his or her experience with the type of paper or document and assignment being reviewed. Thus, a human makes the final determination, but the tedious work of making a determination of which documents to check more closely is carried out by a computer. The program simply reads in the submitted document and the archive document, sets values for the sentences in the two documents, and scrolls through each document looking for matches. Once matches are found, they are noted so the reviewer can make a determination if further checking is required.

A handin program allows students to submit papers electronically to a network drive, which they first have to create access to, or to the teacher's hard drive, depending on how the teacher decides to set up the process. One feature of the present method is that the program can store student work on the network for other teachers to compare to their students' work; however, it can be run on a computer of an individual teacher.

It is also observed that the method embodying the present invention can also be used to check tests involving essay responses. In such an instance, the archive document will be a test containing correct essay responses and the submitted document will be the test paper. The sentences of the archive document will be assigned numerical values, and the sentences of the submitted test will be assigned numerical values and the two numerical values compared. In this situation, a match is desirable. The closeness of the match can be used to determine grades as well.

Referring first to FIG. 1, it is noted that the broad aspects of the method embodying the present invention include the step of loading a program embodying the present invention, sometimes referred to herein as a checker program, into a computer of a teacher as indicated by the step designated by the numeral 10, and then loading the submitted document into the computer in a program embodying the present invention, sometimes referred to herein as a handin program, as indicated by the step designated by the numeral 12, which step 12 includes assigning numerical values to each sentence in the submitted document according to a formula discussed hereinbelow. In the next step, the reviewer then determines which documents to be checked in a program embodying the present invention, sometimes referred to herein as a validation program, as indicated by the step designated by the numeral 14, followed by the step of running a plagiarism check in step 16, which includes comparing the numerical values of the sentences from the submitted document to numerical values determined by the same formula for archive documents. Matches as defined by the teacher will be noted. The teacher will then individually review any submitted document that has more matches than is predetermined to be questionably acceptable, whereby the final determination of whether the person submitting the document for review has plagiarized is ultimately made by the reviewer himself, with the computer program being used only for the initial screening of which papers need to be reviewed more closely. Thus, the ultimate decision is made by the reviewer with the computer being used only to "weed out" those documents requiring closer attention.

FIG. 2 illustrates the method embodying the present invention in greater detail, and attention is directed thereto for the following discussion.

As shown in FIG. 2, the method for detecting plagiarism comprises handing in a document to be reviewed in step 12, which includes sub-steps of receiving a checker identification number ("checker ID") and a checker password from an individual submitting the document to be checked in step 22, verifying the checker ID and password in step 24, setting a current directory based on the checker password in step 26, submitting a document from the individual submitting the document to be checked to the checker in step 28, reading in the document submitted by the individual to the checker into the checker's computer in step 30, and storing each sentence in the submitted document as a string of variables in step 32. It is noted that the use of ID and passwords eliminates students from flooding other teachers' archives with their documents. Step 32 is carried out by converting each sentence in the document submitted by the individual into a numerical value according to the formula $$V = \sum_{i}^{n} (a_i)^2$$

where V is a numerical value assigned to each sentence in the submitted document, n is the number of characters in the sentence in the document submitted for which V is being determined, and $a_i$ is the ASCII value of the $i^{th}$ character in the sentence in the document submitted in step 34 for which V is being determined. The numeric value V decreases the sorting and comparison times and also cuts down memory requirements within the program. It is also noted that the preferred form of the program accepts only documents submitted in .txt format because almost all word processing programs will allow students to save work in the .txt, or text-only, format. Step 34 includes the substeps of setting the numerical value of each sentence in the submitted document to zero in step 36, squaring the ASCII value of each character in each sentence in the submitted document in step 38, adding the values of the squared ASCII values together for each sentence in the document submitted to determine the numerical value to be assigned to each sentence in the submitted document in step 40, and repeating steps 38 and 40 for each sentence in the document until the end of the sentence in step 42.

The method is continued by creating an archive for the checker based on the checker ID and creating a file for the individual submitting the document in the checker archive based on the checker ID in step 44 which includes substeps of writing each sentence on an available line of the file created for the individual in the checker archive in step 46 and writing the numerical value of each sentence on a next available line in the file created for the individual in the checker archive in step 48. Steps 46 and 48 are repeated in step 49 until all sentences and numerical values have been written into the file in the checker's computer.

Validating the file from the individual to the checker of step 14 includes reading the checker ID in step 50, setting a current directory based on the checker ID in step 52, reading in all files from the current directory into the checker's computer in step 54, displaying a list of all individuals that have submitted work to the checker in step 56, selecting an individual from the list of all individuals to view a document that has been submitted by that selected individual in step 58, and displaying the document submitted by the selected individual in a rich text box in step 60. By permitting a teacher or other reviewer to click onto a particular individual's name, the reviewer can verify that "junk" documents have not been submitted. It also allows reviewers to view the list of individuals that turned in work. A list of submitters can be printed and the submitted work itself can be printed if desired. A reviewer can also change his or her password to prevent submitters, such as students, from submitting late work.

Step 16 of checking the displayed document for plagiarism includes inputting the checker ID in step 62, setting current directory based on the checker ID in step 64, selecting an archive to compare the file submitted by the individual against in step 66, reading in each document from the selected archive in step 68, setting a numerical value for each sentence in the selected archive in step 70 according to the formula $$V = \sum_{i}^{n} (a_i)^2$$

where V is a numerical value assigned to each sentence in the archive, n is the number of characters in the sentence in the archive for which V is being determined, and $a_i$ is the ASCII value of the $i^{th}$ character in the sentence in the archive for which V is being determined, reading in and storing the numerical values for each sentence in the document being checked, sorting the numerical values of all sentences in the document being checked using a comb-type sort in step 72, checking for identical sentences by scrolling through the sorted list in step 74. Step 74 includes the substeps of comparing the numerical value of each sentence in the document being checked to a numerical value for each sentence in the selected archive in step 76, if the compared numerical value for a sentence in the document being checked is the same as, or within a predetermined range of, the numerical value for a sentence of a sentence in the selected archive, and making a record that two sentences matched and continue checking each sentence in the document being checked against sentences in the selected archive in step 78. If the numerical value of the checked sentence is not within the predetermined range of, that is, is essentially equal to, the numerical value of the archive sentence, using the next element on the list as the current value in step 80, with steps 76–80 being repeated until the entire list has been checked as noted in step 82. The archive used to check a submitted document against can include encylopedias, dictionaries, Internet documents, other papers, other papers by the same submitter and the like.

The method step 16 is continued by reporting the number of records made during the checking of the submitted document in step 84. As indicated in steps 86 and 88, the method is repeated for further archives in step 86 and further archives are made in step 88.

It is understood that while certain forms of the present invention have been illustrated and described herein, it is not to be limited to the specific forms or arrangements of parts described and shown.

I claim:
1. A method for detecting plagiarism comprising:
   a) handing in a document to be reviewed which includes steps of
      (1) receiving checker ID and checker password from an individual submitting the document to be checked,
      (2) verifying checker ID and password,
      (3) setting a current directory based on the checker password,
      (4) submitting a document from the individual submitting the document to be checked to the checker,
      (5) reading in the document submitted by the individual to the checker,
      (6) storing each sentence in the document in an array of string variables,
      (7) converting each sentence in the document submitted by the individual into a numerical value according to the formula

$$V = \sum_{i}^{n} (a_i)^2$$

where V is a numerical value assigned to each sentence in the submitted document, n is the number of characters in the sentence in the document submitted for which V is being determined, and $a_i$ is the ASCII value of the $i^{th}$ character in the sentence in the document submitted for which V is being determined, including
   (A) setting the numerical value of each sentence in the document submitted to 0,
   (B) squaring the ASCII value of each character in each sentence in the submitted document,
   (C) adding the values of the squared ASCII values together for each sentence in the submitted document to determine the numerical value to be assigned to each sentence in the submitted document;
b) creating an archive for the checker based on the checker ID;
c) creating a file for the individual submitting the document in the checker archive based on the checker ID including
   (1) writing each sentence on an available line of the file created for the individual in the checker archive, and
   (2) writing the numerical value of each sentence on a next available line in the file created for the individual in the checker archive;
d) validating the file from the individual to the checker including
   (1) reading the checker ID,
   (2) setting a current directory based on the checker ID,
   (3) reading in all files from the current directory,
   (4) displaying a list of all individuals that have submitted documents to the checker,
   (5) selecting an individual from the list of all individuals to view a document that has been submitted by that selected individual, and
   (6) displaying the document submitted by the selected individual in a rich text box; and
e) checking the displayed document for plagiarism by
   (1) inputting the checker ID,
   (2) setting current directory based on the checker ID,
   (3) selecting an archive to compare the file submitted by the individual against,
   (4) reading in each document from the selected archive,
   (5) setting a numerical value for each sentence in the selected archive according to the formula $$V = \sum_{i}^{n} (a_i)^2$$

where V is a numerical value assigned to each sentence in the archive, n is the number of characters in the sentence in the archive for which V is being determined, and $a_i$ is the ASCII value of the $i^{th}$ character in the sentence in the archive for which V is being determined,
   (6) reading in and storing the numerical values for each sentence in the document being checked,
   (7) sorting the numerical values of all sentences in the document being checked using a comb-type sort,
   (8) checking for essentially identical sentences by scrolling through the sorted list,
   (9) comparing the numerical value of each sentence in the document being checked to a numerical value for each sentence in the selected archive,
   (10) if the compared numerical value for a sentence in the document being checked is essentially the same as the numerical value for a sentence in a sentence in the selected archive, making a record that two sentences matched and continuing to check each sentence in the document being checked against sentences in the selected archive, and
   (11) reporting the number of records made during the checking of the submitted document.

2. The method as described in claim 1 wherein the selected archive includes other documents submitted by the student submitting a document to the teacher.

3. A method for detecting plagiarism comprising:
a) submitting a document to be checked;
b) placing a numerical value on each sentence in the document to be checked according to the formula $$V = \sum_{i}^{n} (a_i)^2$$

where V is a numerical value assigned to each sentence in the document to be checked, n is the number of characters in the sentence in the document to be checked for which V is being determined, and $a_i$ is the ASCII value of the $i^{th}$ character in the sentence in the document to be checked for which V is being determined;
c) selecting an archive against which the document to be checked is to be checked;
d) placing a numerical value on each sentence in the archive according to the formula $$V = \sum_{i}^{n} (a_i)^2$$

where V is a numerical value assigned to each sentence in the archive, n is the number of characters in the sentence in the archive for which V is being determined, and $a_i$ is the ASCII value of the $i^{th}$ character in the sentence in the archive for which V is being determined;
e) comparing the numerical values of each sentence in the document to be checked against the numerical values of each sentence in the archive; and
f) identifying sentences from the document being checked that have numerical values essentially equal to numerical values of sentences in the archive.

\* \* \* \* \*